J. J. ALBRIGHT.
REGISTER.
APPLICATION FILED FEB. 6, 1918.
1,392,899.
Patented Oct. 11, 1921.
3 SHEETS—SHEET 1.
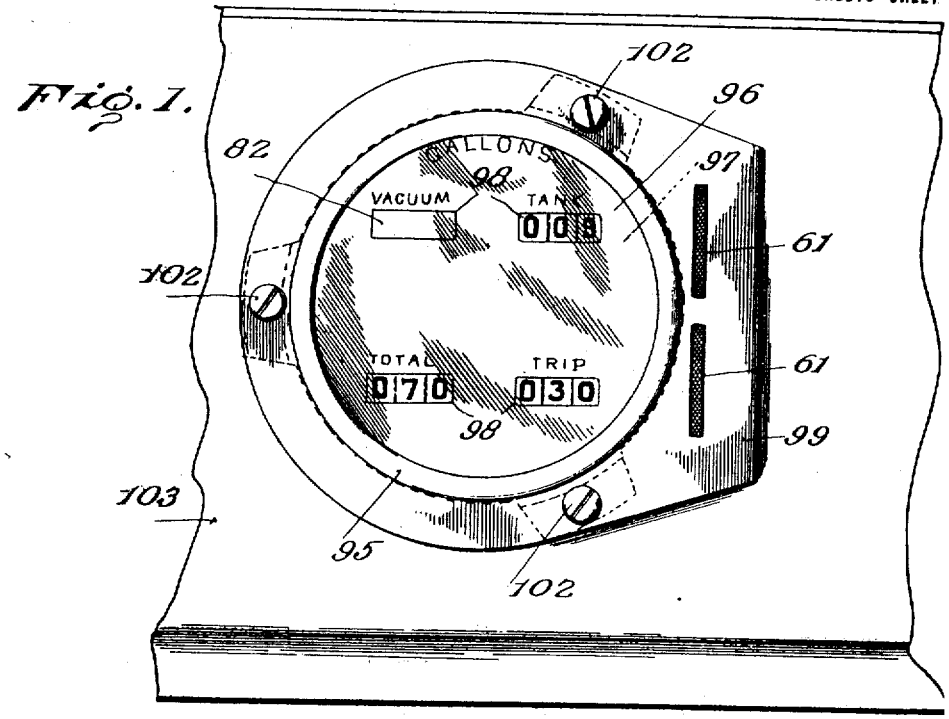
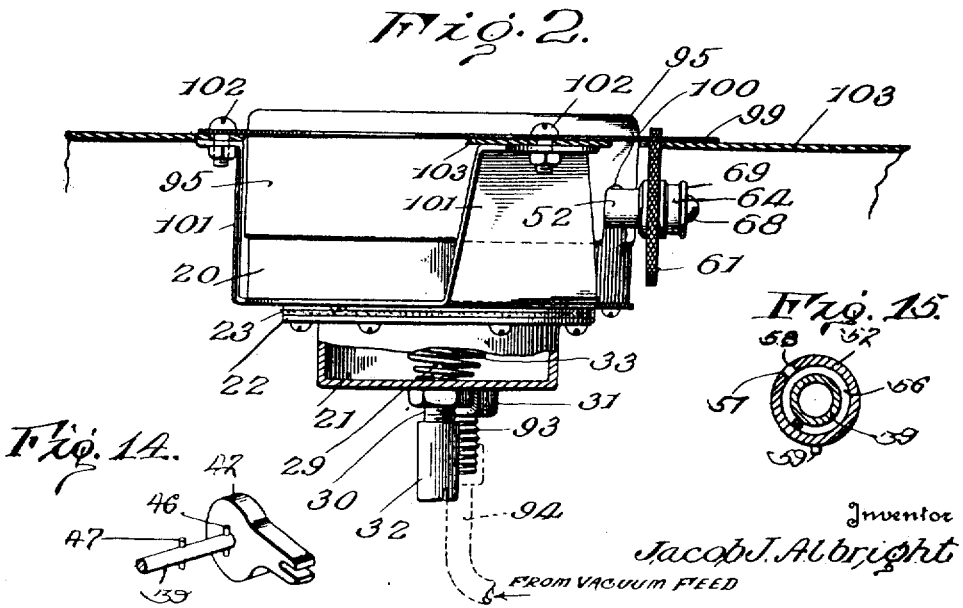
Inventor
Jacob J. Albright
By Edgar M. Kitchin
His Attorney.

J. J. ALBRIGHT.
REGISTER.
APPLICATION FILED FEB. 6, 1918.

1,392,899.

Patented Oct. 11, 1921.
3 SHEETS—SHEET 2.

Inventor
Jacob J. Albright.
By Edgar M. Kitchin
His Attorney

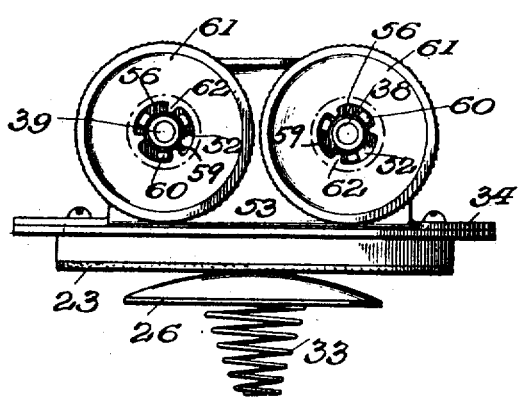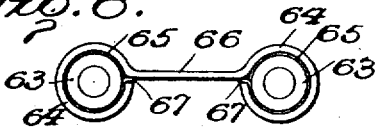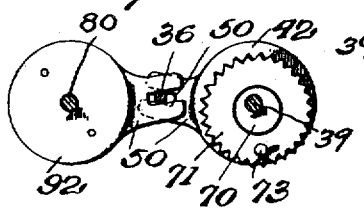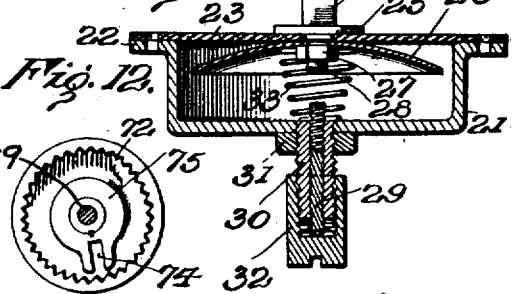

UNITED STATES PATENT OFFICE.

JACOB J. ALBRIGHT, OF COLUMBUS, GEORGIA, ASSIGNOR OF ONE-THIRD TO JAMES H. FARISH AND ONE-THIRD TO B. CRAWFORD JENKINS, BOTH OF COLUMBUS, GEORGIA.

REGISTER.

1,392,899.  Specification of Letters Patent.  Patented Oct. 11, 1921.

Application filed February 6, 1918. Serial No. 215,622.

*To all whom it may concern:*

Be it known that I, JACOB J. ALBRIGHT, a citizen of the United States, residing at Columbus, in the county of Muscogee and State of Georgia, have invented certain new and useful Improvements in Registers; and I do hereby declare the following to be a full, clear, and exact description of the invention, such as will enable others skilled in the art to which it appertains to make and use the same.

The present invention relates to a register or meter adapted for use in showing the intermittent flow of liquid past a certain point, and has for an object to provide a meter of this character for application to a gasolene feeding system wherein the fuel is fed through the system by the suction of the internal combustion engine, the present invention providing a structure of meter which may be actuated by the intermittent suction formed in the system for feeding the fuel.

Another object of this invention is to provide a construction of register or meter wherein the mechanism is susceptible of operation incident to slight impulse for insuring the correct registering in the meter of all amounts of the fuel which are fed by the vacuum for enabling the correct measurement of the liquid even though the system fails to feed the fuel in uniform quantities by the suction in the system.

A further object is to provide an improved clutch for use particularly in the register for insuring the registering of varying amounts of the liquid passing through the system and to take the place of the intermittent grip devices usually employed wherein detents and ratchet wheels are used and which require a predetermined movement of the actuating mechanism for effecting a predetermined advancement of the register mechanism.

A further object is to provide in a register an improved arrangement of novel clutches constructed according to this invention for advancing the number of wheels in the desired directions and retaining them from retrograde movement, and to provide setting mechanisms associated with the clutches in a manner to release certain of the same for admitting the advance or return movement of the setting devices for initially setting or resetting the number wheels.

With these and further objects in view as will in part hereinafter become apparent and in part be stated, the invention comprises certain novel constructions, combinations and arrangements of parts as subsequently specified and claimed.

In the accompanying drawings,—

Figure 1 is a front elevation of a meter constructed according to the present invention and mounted in the instrument board of a motor vehicle or the like.

Fig. 2 is a bottom plan view of the same, partly in section.

Fig. 5 is a side elevation with the cover and vacuum cup removed.

Fig. 6 is a fragmentary, detail perspective view of one of the counter-actuating sleeves and coöperating parts, parts being removed and other parts broken away.

Fig. 7 is a detail perspective view of one of the inner clutch drums detached and carrying its gripping spring.

Fig. 8 is an elevation of the outer clutches with their connection detached, and showing the inner faces of the clutches.

Fig. 9 is a view in side elevation of the opposite side from that shown in Fig. 5, the diaphragm-return spring being omitted, and the indicator being shown in section.

Fig. 10 is a transverse section through the counter shafts, the inner clutches being seen in elevation.

Fig. 11 is a similar view taken at the opposite side of the inner clutches.

Fig. 12 is a transverse section through the shaft of the total counter group, the end counter wheel thereof being seen in elevation.

Fig. 13 is a central section taken through the vacuum cup and contiguous parts, outer portions of the instrument being omitted.

Fig. 14 is an enlarged, detail sectional perspective view showing one of the inner clutches in the act of being placed on one of the counter group shafts, and illustrating the manner of locking the clutch to the shaft.

Fig. 15 is a transverse section taken on the plane indicated by line 15—15 of Fig. 6, the parts being shown on an enlarged scale.

Figure 3:
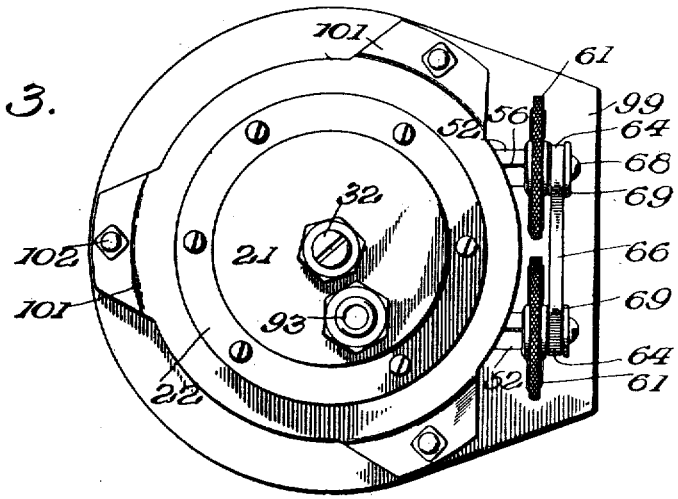
Fig. 3 is an elevation of the rear of the instrument detached.

The principle of operation of a structure embodying the present invention is such as to take advantage of the intermittent formation of a partial vacuum occurring in vacuum feed systems for internal combustion engines, which advantage is utilized for indicating in units of predetermined value the number of times the partial vacuum is formed.

In the embodiment of the invention illustrated in the accompanying drawings, the meter comprises a casing 20 to the rear side of which is secured a cup 21 forming a vacuum chamber, and which is of less diameter than the casing 20 and secured thereto by screws, or the like, passing through an outturned flange 22 formed on the open side of the cup. A diaphragm 23, of rubber or suitable composition, is interposed between the casing 20 and the flange 22 for sealing the cup 21 against the casing and for anchoring the diaphragm between the two. The diaphragm 23 is secured at its middle portion upon a rod or bar 24 which has a collar 25 upon its lower reduced end against which the outer surface of the diaphragm 23 bears, and the inner surface of the diaphragm 23 flexes over a concavo-convex disk 26 secured to the rod 24 and against the diaphragm by a binding nut 27. The convexed side of the disk 26 faces the diaphragm 23 to admit the free flexing of the diaphragm for reciprocating the rod 24. The reduced inner end of the rod 24 projects beyond the binding nut 27 and forms a projection or pin 28 adapted to engage the end of a stop screw 29. The screw 29 is threaded in an elongated bushing 30 which is externally threaded and engaged in the closed end of the cup 21 in line with the rod 24. A lock nut 31 surrounds the bushing 30 and binds against the cup 21 to hold the bushing in place. The bushing carries a cap 32 on its free end for closing the same and for binding engagement against the adjacent end of the stop screw 29. Both the screw 29 and the cap 32 have kerfs or other formations on their outer ends to facilitate adjustments of these parts. A convolute spring 33 is seated against the inner side of the cup 21 about the adjacent end of the stop screw 29, the larger end of the spring 33 engaging within the disk 26 to normally urge the rod 24 outward. The stop screw 29 is adjusted within the bushing 30 to limit the inward movement of the rod 24.

Figure 4:
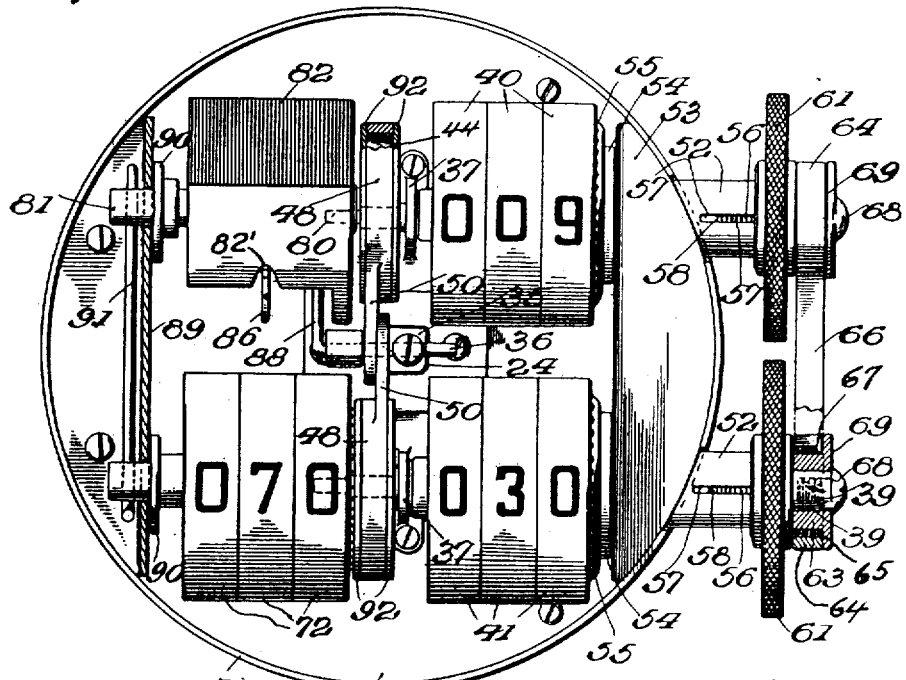
Fig. 4 is an enlarged, front elevation thereof with the cover removed, parts being seen in section.

The rod 24 is slidably mounted in a base plate 34 and projects outwardly from the same, and is provided at one side with a longitudinally-extending lug or projection 35 having a transverse aperture therethrough to receive a connecting pin 36. Bracket bearings 37 project outwardly from the base plate 34 near the top and bottom thereof and support counter shafts 38 and 39. The shafts 38 and 39 are provided, respectively, with sets of counter wheels 40 and 41, the counter wheels 40 being adapted to operate for subtracting units from a predetermined set amount, while the counter wheels 41 are adapted for indicating the amounts subtracted by the counter wheels 40. These opposite operations of the counter wheels 40 and 41 necessitate the advancement of the shafts 38 and 39 in opposite directions, and to accomplish this result each shaft is provided with a clutch, and the clutches operate in opposite directions. These clutches for convenience of identification, are called the inner clutches. Each clutch comprises an inner drum or hub 42, best seen in Fig. 7, having an axial opening therethrough for the reception of its respective shaft, and provided on one end with an outstanding annular flange or head 43. A gripping element 44 is employed, the same comprising a spring having at least two and one-half coils yieldingly binding upon the periphery of the drum 42 with one end free and with its other end turned out from the surface of the drum to form a lug 45. Each drum 42, as shown in Fig. 10, is provided with a transverse slot 46 in its outer face intersecting the axial opening, and adapted to receive therein a transverse pin 47 carried upon the adjacent shaft for locking the drum 42 to the shaft. A sleeve 48 surrounds the drum 42 and has an internal diameter larger than the external diameter of the drum for loosely accommodating the spring 44, as best seen in Fig. 4. The sleeve 48 is provided at one side with a recess 49 into which the lug 45 is adapted to fit. When the sleeve 48 turns in one direction it relaxes the spring 44 from the drum 42 and the sleeve is free to turn in that direction about the drum while leaving the drum stationary. When the sleeve 48 is turned in the other direction it increases the binding action of the spring 44 on the drum 42 and the spring thus cannot slip about the drum and moves the drum 42 with the sleeve. As the spring 44 normally grips the drum there can be no slippage of the spring on the drum when the sleeve moves in the direction for coiling the spring, and thus there is no lost motion in the clutch. The springs 44 of the clutches on the shafts 38 and 39 are wound in opposite directions and the sleeves 48 are provided with radial arms 50 which are of sufficient length to overlap between the shafts. The arms 50 have each a longitudinal slot 51, and the pin 36 mounted on the rod 24 passes through the slots 51 for connecting the arms 50 together and to the rod. This structure is shown to advantage in Fig. 10 where it will be observed that when the pin 36 is drawn down the springs 44 are caused to bind tighter upon the drum and thus turn the drums in the directions in which the sleeves 48 are turned. As soon as the pin 36 rises, the sleeves 48 are turned in opposite directions and the springs 44 are relaxed from the drums to release the same. The shafts 38 and 39 are thus intermittently advanced in one direction by reciprocation of the pin 36 between the shafts. It should be understood that the clutches just described function with absolute precision as the coils 44, at the very instant of the beginning of the return movement, release, and, therefore, do not carry back their drums, whereas they grip the drums at the very instant of the beginning of the advance movement so that the step-by-step advance of drums 42 is identical in distance with the angular movement in one direction of the respective sleeve 48 and there is no lost motion whatsoever.

As shown in Fig. 6, each shaft, such as the shaft 39, is provided with a sleeve 52 having bearing in an outstanding flange bracket 53 carried upon the base plate 34 at the side of the instrument adjacent to the setting mechanism. The inner end of the sleeve 52 is provided with an enlarged head or flange 54 bearing against the inner side of the bracket 53 and carrying an annular rack 55 adapted to engage the internal rack of the adjacent counter wheel 40 or 41. Counter wheels 40 and 41 are of well known commercial type and the successive wheels of each group are actuated in the well known manner so that detail illustration is not necessary, the internal rack present in the outermost counter wheel of each counter group being utilized as a convenient means of locking the counter wheel to its actuating sleeve 52 by the respective rack 55. Any other convenient means of connecting the sleeve to the outermost wheel of the respective counter group could be used.

Each sleeve 52 is the driver for its respective counter group and is adapted to rotate its immediately engaged counter wheel in either direction when the sleeve is manually actuated, but to move the respective counter wheel only in the predetermined direction of addition or subtraction, as the case may be, when the said sleeve is driven by the shaft which it surrounds. For the purpose of transmitting motion from each shaft to its respective sleeve, the shaft 38 or 39 is intermittently advanced in one direction only (one moving in the opposite direction of rotation from the other) and each is connected with its respective sleeve 52 by a clutch capable of transmitting motion from the shaft to the sleeve during normal operation and capable of easy and quick release for allowing the sleeve to rotate freely in either direction when the sleeve is actuated manually. The clutches between the shafts and sleeves will, for convenience of identification, be referred to as the intermediate clutches and each consists of a coiled spring 56 arranged within the respective sleeve 52. Each sleeve 52 has a longitudinal slot 57 opening through the outer end of the sleeve for the reception of a projection or lug 58 formed upon the inner end of spring 56, the outer end of the spring being free and the spring being coiled to fit tightly upon its respective shaft, so as to bind upon the shaft when the latter advances in the direction tending to further coil the spring, and to release its grip upon the shaft when the shaft moves angularly in the reverse direction tending to open the coil. The respective sleeve would thus be held against reverse rotation by the gripping of the intermediate clutch coil on its shaft if provision were not made for temporarily preventing such gripping action when the sleeve is moved manually. To this end, each sleeve 52 has projecting longitudinally from its outer end spaced fingers 60, there being preferably three such fingers for each sleeve equally spaced about the sleeve. The outer or free end of each spring 56 has a laterally extending projection or lug 59, which lies between a pair of adjacent fingers 60, the fingers being sufficiently spaced apart to leave the projection 59 free so that the outer end of spring 56 is functionally free during normal operations, the relation between adjacent fingers and the respective projection 59 remaining constant during operation because the sleeve and its fingers rotate only as the spring 56 rotates, when the parts are actuated by the inner clutches. That is to say, the longitudinal fingers 60 are spaced apart angularly a distance sufficient to allow free play of the outstanding lug 59 during the normal operation of a step-by-step forward movement of shaft 39 as the shaft receives successive angular impulses from the clutch 44, the spring 56 functioning identically the same as clutch 44 in transmitting step-by-step motion from shaft 39 to sleeve 52. Since the sleeve 52 advances angularly under the impulse imparted by spring 56 in exactly the same ratio as the advance of shaft 39, the relation of the lug or projection 59 to the fingers 60 will remain constant save for the special or extraordinary function in enabling the resetting of the counter group as will be hereinafter set forth, and at all other times than during the operation of such resetting the spring 56 functions as a clutch exactly the same as if the lug 59 were not present, since projection 59 is free to play in the angular space between two of the fingers 60, but, in fact, has in actual practice no perceptible play, because the clutch action both in grasping and in releasing shaft 39 is instantaneous.

For manually manipulating the sleeves 52, wheels or disks 61 are mounted on the outer ends of the sleeves, as best seen in Figs. 3 and 5, each wheel 61 having spaced, relatively narrow prongs 62 projecting in the spaces between the fingers 60 of the respective sleeve. One prong of each wheel 61 is disposed in position for engaging the projection 59 of the respective spring 56, so that when the wheel 61 is turned in that direction in which sleeve 52 is normally held against rotation by spring 56, the contact of the said prong against the projection 59 will cause the spring 56 to be released from its grip on its respective shaft and the sleeve will thus be left free to rotate by the temporary destroying of the normal function of the intermediate clutch spring, the spring revolving freely about its shaft with the sleeve which is being actuated. As soon as the operator releases the wheel 61, the respective spring 56 will again grip its shaft and the parts are restored for continued normal functioning. Obviously, when either wheel 61 is rotated in the direction causing that movement of its respective sleeve 52 which tends to open the spring 56, there is no resistance to the movement by the spring, and, therefore, each of the sleeves is at all times in condition for being freely rotated in either direction by manipulation of its respective wheel 61, the prongs 62 interlocking with the fingers 60 serving to insure transmission of motion from the peripheral portion of the respective wheel to the sleeve.

The shafts 38 and 39 project outward from their respective sleeves 52 and receive thereon the drums 63 of outer clutches. The outer clutches have sleeves 64 surrounding the drums 63 with springs 65 between the drums and the sleeves and wound thereon as illustrated in Fig. 8. The sleeves 64 of the outer clutches are preferably formed from a single length of strip material which is wrapped in opposite directions about the spaced drums and extends across the space to connect the sleeves and hold the same against turning. The returned ends of the strip are slightly spaced from the cross bar 66 of the strip to form slots into which project the lugs 67 of the coil springs 65. The springs 65 are so wound about their drums as to hold the shafts 38 and 39 from retrograde movement, and the clutches thus formed are of the variable grip type to operate upon the shafts irrespective of the distance of advance of the shafts. The outer clutches are held in place by headed screws 68 secured in the outer ends of the shafts 38 and 39, and which engage against plates 69 to hold the same against the outer ends of the drums 63 for retaining the springs 65 thereon and inclosing the springs.

The shaft 39 imparts motion to a counter group 72, which counter group may function for any desired purpose, but ordinarily is intended to serve as a totals counter, while the counter group 41 serves to show the total only of a trip or other limited use. Similarly to groups 40 and 41, the counter group 72 is made up of counter wheels and motion transmitting devices for imparting motion from one wheel to the next, all of well known commercial form, so that detail disclosure and description is unnecessary. The general type of these counter groups is indicated by the structure shown in Fig. 9, in which the motion transmitting parts for conveying motion from one wheel to the next are partly shown consisting of the boss 76, pinion 78 carried thereby, rack 77 with which the pinion coöperates, and recess 79 in the rack coöperating with parts not illustrated. As all of these parts are common to commercial counter groups, a statement of their function is not required. Any appropriate direct connection may be employed between the shaft 39 and the first wheel of counter group 72, one being shown which possesses the merit of convenience in application and use of a well known commercial counter wheel. The means of engagement between the shaft 39 and the first counter wheel of the group 72 is clearly indicated in Figs. 11 and 12, and consists of parts connected with the shaft 39 and adapted to interlock with parts found present in the commercial form of the wheels 72. This connecting means, as shown, consists of the internal rack and the boss 75 of the counter wheel, the boss having a radial slot 74, and the shaft being provided with an eccentric 70 fixed upon the shaft and carrying a disk 71 having teeth adapted to interlock with the internal gear teeth of the wheel 72. As an additionl connection, a pin 73 is fixed to and outstands from the face of disk 71 in position for extending into the slot 74. Thus the shaft 39 is fixed to the adjacent wheel 72 to cause that wheel to rotate with the shaft, but the counter group may easily be withdrawn laterally from engagement with the shaft 39 and with equal ease applied to the shaft when the parts are being disassembled or assembled.

The shaft 38 terminates beyond its inner clutch in a spindle 80 over which is seated to turn an indicator shaft 81. The shaft 81 carries an indicating drum 82 which is preferably hollow and substantially semi-cylindrical in construction. The shaft 81 carries an arm 83 (seen in Fig. 9) arranged within the drum 82 and extending through a slot 82' in one side of the drum. The arm 83 is provided with a hook 84 which is returned through the slot and which carries one end of a spring 85. The other end of the spring is connected to the far side of the drum 82 for urging the drum to turn in a direction to move the drum against the hook 84. The end of the drum carries an inwardly-projecting stud or pin 87 with which an arm 88 contacts, the arm being carried upon one end of the pin 36 which projects through the outer end of the bar 24. When the bar 24 is projected outwardly by the spring 36, the arm 88 bears against the stud 87 and holds the drum in a position to indicate that suction is not taking place. As soon, however, as the bar 24 is drawn inwardly, the arm 88 releases the pin 87 and the spring 85 is free to turn the drum sufficiently for exposing the signal portion of the drum in the side opening of the casing. Proper functioning of the registering mechanism will thus become visually apparent to the operator from successive actuations of drums 82.

The surface of the drum 82 is preferably divided by coloring or the like to accentuate the visual indications of the state of operation of the register.

The rear portion or extension of the shaft 39 and the indicator shaft 81 are held in a second flange bracket 89 by collars 90 bearing against the inner side of the bracket 89, and by a cross pin 91 which engages at opposite ends diametrically through the shafts. The pin 91 holds the shafts from turning. The inner clutches are preferably housed in by plates or disks 92 which surround the shafts 38 and 39 and bear against the opposite sides of the drums 42 and the sleeves 48. These plates or disks may be held to the drum by rivets or the like and the sleeves 48 are free to turn between the disks.

The cup 21 is provided near one side with an attaching nipple 93 opening into the cup and to which a vacuum pipe 94 may be attached for connecting the cup 21 with any means for creating a partial vacuum. The casing 20 is closed at its outer end by a removable cap 95 which is provided with an inturned flange at its outer edge adapted to retain a transparent disk or panel 96 against the outer end of the casing to admit free inspection and reading of the various counter wheels and the indicator. A face plate 97 is placed over the outer end of the casing 20 behind the panel 96 and has slots 98 formed therein to expose the counter wheels and the indicator at the desired point where the readings are to be taken. A frame plate 99 is placed around the cap 95 and provided with slots through which the setting wheels or disks 61 project, the wheels 61 having milled or otherwise roughened edge portions to facilitate turning of the wheels by the thumb or finger when moving the same through the frame plate 99. The cap 95 is provided in its flanged portion with slots or recesses 100 through which the sleeves 52 project and for admitting the ready placing and removal of the cap with respect to the casing 20. The casing is held to the frame plate 99 by a frame or spider 101 which is secured to the inner end of the casing 20 about the cup 21 and which has arms lying against the sides of the casing and the cap and secured at their free ends to the frame plate. The bolts by bolts 102 to the frame plate and the bracket 102 also hold the frame plate and the bracket to the instrument board 103, or to any other suitable support.

In operation, when suction is produced in the pipe 94 the diaphragm 23 is flexed into the cup 21 and the rod 24 is drawn inward. The throw of the rod 24 is restricted by the stop screw 29 which is adjusted to prevent undue advancement of the shafts 38 and 39 upon the complete thrown of the rod 24. When the rod 24 is drawn inward the inner clutches of the shafts 38 and 39 turn the latter in opposite directions and operate the counter wheels 40 to designate units of quantity withdrawn by reason of the formation of the vacuum. The counter wheels 41 are operated in a reverse direction to add the units subtracted by the counter wheels 40. At the same time, the total counter group is correspondingly advanced by intermittently operating the counter wheels 72 by the shaft 39. Each time the rod 24 is drawn inward the arm 88 which is carried by the rod is moved away from the stud 87 and the spring 85 turns the indicator drum sufficiently to expose a normally covered portion thereof through the sight opening in the face plate 97 for indicating that the rod has been drawn inward.

When the rod 24 is released, the spring 33 projects the rod into normal position and the inner clutches are released from the shafts 38 and 39. The outer clutches, being connected by the cross bar 66, hold the shafts against any possible return movement.

The subtracting and adding counters 40 and 41 may be independently adjusted as desired by turning the independent setting wheels 61, the wheels 61 releasing the counters from their respective shafts as above outlined.

The device may, of course, be modified as to the arrangement of the number wheels to indicate various units of measure according to the application of the register, and the register is operable by connecting the pipe 94 to any source of successive vacuum impulses.

This invention is characterized by its capacity for accurate calibration and the use of the coiled spring clutches insures a transfer of motion to the counters exactly equal or proportionate to the amount of motion imparted to the actuated diaphragm under the successive vacuum impulses. The term "vacuum impulse" is employed merely for convenience, signifying, of course, an impulse incident to an unbalanced condition of air pressure due to the successive formations of a partial vacuum within the cup 21 caused by the suction of the moving pistons of the engine and their influence upon the vacuum feed system of the engine, as is well known in the art. The value of accurate calibration of the present improved mechanism cannot be over-estimated, since lack of accurate calibration would completely destroy reliability in the operation of the counter groups and accuracy in the final results shown. The great extent of possible variation in the operation of one vacuum feed system from that of another, incident to differences in the constructions of the engines to which the particular system is applied and to peculiarities of the particular engine itself, are so well known as to require merely to be mentioned to indicate the extreme delicacy with which the present improved instrument must be calibrated, not generally to a whole class of engines or a whole class of vacuum feed devices, but specifically and particularly to the one identical feed device on the one identical engine forming part of the automobile to which the present improved mechanism is to be applied. The clutches thus employed and their coöperation with the other parts including their relation to the adjusting screw 29 with its capacity for effecting variations in the actuating strokes of the clutches incident to and corresponding with variations in the feeding system are of prime importance in the commercializing and general utility of the present invention.

What I claim is—

1. In a register, the combination, with a frame, of independent counter groups rotatably sustained by the frame, means for actuating the counter groups for advancing the counter wheels thereof, means for preventing retrograde movement of each of the counter groups, and means connecting the retrograde movement preventing means of the counter groups for rendering the same effective, said connecting means being independent of the frame except through engagement with the retrograde movement preventing means.

2. In a register, the combination of a counter group, means for actuating the same, a drum connected with the counter group, a spring coiled snugly about the drum and having one end free, means of anchorage for the other end of the spring, the spring being of sufficient length and tensioned to grip the drum when the latter is stressed to move in the direction of retrograde movement of the counter group, and means adapted to be manually actuated for shifting the counter group in either direction independently of the drum.

3. In a register, the combination of a counter group, means for actuating the same, a coiled spring clutch for preventing retrograde movement of the counter group, means for anchoring the clutch, and means for manually actuating the counter group in either direction independently of the clutch.

4. In a register, the combination, with a frame, of a shaft journaled therein, a counter group to be actuated by the shaft, a sleeve surrounding the shaft and engaging one of the wheels of the counter group, means for advancing the shaft in one direction only, releasable means for transmitting motion from the shaft to the sleeve, and manually actuated means engaging the sleeve and motion transmitting means for enabling shifting of the sleeve independently of the shaft for moving the counter group in either direction.

5. In a register, the combination, with a frame, of a shaft journaled therein, a counter group to be actuated by the shaft, a sleeve surrounding the shaft and engaging one of the wheels of the counter group, means for advancing the shaft in one direction only, a releasable clutch for transmitting motion from the shaft to the sleeve, and manually actuated means engaging the sleeve and the clutch for enabling shifting of the sleeve independently of the shaft for moving the counter group in either direction.

6. In a register, the combination, with a frame, of a shaft journaled therein, a counter group to be actuated by the shaft, a sleeve surrounding the shaft and engaging one of the wheels of the counter group, means for advancing the shaft in one direction only, a releasable coiled spring clutch for transmitting motion from the shaft to the sleeve, and manually actuated means engaging the sleeve and the clutch for enabling shifting of the sleeve independently of the shaft for moving the counter group in either direction.

7. In a register, the combination, with a counter group, of means for rotating the wheels thereof, a vibrator for actuating the rotating means, said vibrator being responsive to fluctuations in pressure incident to the delivery of material being measured, and means in axial alinement with the vibrating means for varying the length of the vibrations proportionally to the quantities delivered for calibration of the counter group.

8. In a register, the combination, with a counter group and means for advancing the same, of a diaphragm adapted to be vibrated by vibrations in pressure incident to quantities of material being measured, a rod fixed to the diaphragm and engaging and actuating the means for advancing the counter group, and a set screw adjustably mounted in line with the end of the rod in position for being struck thereby for limiting the possible length of the strokes thereof incident to vibrations of the diaphragm for calibrating the counter group.

9. In a register, the combination with number wheels, and means for actuating the number wheels, of a reciprocating element for operating said actuating means, a diaphragm carried by the reciprocating element, a housing for the diaphragm adapted to be evacuated for flexing the diaphragm and operating the reciprocating element, a bushing projecting through the housing in line with the reciprocating element, a locknut for the bushing, a stop screw threaded through the bushing and adapted to be advanced toward the reciprocating element to limit the vibration thereof, a cap threaded upon the outer end of the bushing for binding engagement against the stop screw to lock the same in the bushing, and a spring arranged between the inner end of the stop screw and the reciprocating element for normally advancing the latter away from the stop screw.

10. In a register, the combination, with a counter group, of a shaft for actuating the counter group, said shaft being adapted to be advanced angularly in one direction only, a sleeve engaging the counter group, and a releasable clutch between the sleeve and shaft for transmitting motion from the shaft to the sleeve, whereby the counter group may be driven by the sleeve in one direction and reset on release of the clutch and reverse motion of the sleeve.

11. In a register, the combination, with a counter group, of means for rotating the wheels thereof, a vibrator for actuating the rotating means, said vibrator being responsive to fluctuations in pressure incident to the delivery of material being measured, a housing inclosing said counter group and vibrator, and means accessible exteriorly of the housing for varying the length of the vibrations proportionally to the quantities delivered for calibration of the counter group.

In testimony whereof I affix my signature in presence of two witnesses.

JACOB J. ALBRIGHT.

Witnesses:
J. J. MAWHINNEY,
C. H. FESLER.